United States Patent [19]
Yamanaka

[11] 4,299,374
[45] Nov. 10, 1981

[54] SOLENOID VALVE

[75] Inventor: Minoru Yamanaka, Toyota, Japan

[73] Assignee: Sisin Seiki Kabushiki Kaisha, Kariya, Japan

[21] Appl. No.: 65,163

[22] Filed: Aug. 9, 1979

[30] Foreign Application Priority Data

Aug. 25, 1978 [JP] Japan ................... 53-116263

[51] Int. Cl.³ .................... F16K 31/06; F16K 27/00
[52] U.S. Cl. .................... 251/129; 251/139; 336/192; 336/198; 339/218 M
[58] Field of Search .................... 335/260; 251/139; 339/218 M; 336/96, 198, 192

[56] References Cited
U.S. PATENT DOCUMENTS

| 3,141,923 | 7/1964 | Henschke et al. | 336/96 X |
| 3,251,015 | 5/1966 | Denham | 336/96 |
| 3,336,552 | 8/1967 | Davis | 336/96 |
| 3,337,046 | 4/1968 | Frantz et al. | 251/139 |
| 3,529,806 | 9/1970 | Kozel | 251/139 |
| 3,551,862 | 12/1970 | Haug | 335/260 |
| 3,588,039 | 6/1971 | Chelminski | 335/278 X |
| 3,726,315 | 4/1973 | Sheppard | 137/625.65 |
| 3,731,881 | 5/1973 | Dixon et al. | 251/139 X |
| 4,076,045 | 2/1978 | Nakajima et al. | 251/139 X |

Primary Examiner—Arnold Rosenthal
Attorney, Agent, or Firm—Oblon, Fisher, Spivak, McClelland & Maier

[57] ABSTRACT

A solenoid valve sealing assembly including a valve housing made of synthetic resin which defines a valve chamber, a magnetic coil wound on a bobbin for generating a magnetic flux, magnetic valve mechanism supported in the chamber for valve movement by the magnetic flux, a plurality of terminals which are electrically connected at both ends of the magnet coil, lead wires which are electrically connected with the terminals for supplying an electrical signal to the magnetic coil and a water proof member for providing waterproofing between the valve housing and the lead wires such that the lead wires are inserted in the waterproof member with the waterproof member being embedded in the valve housing by molding of the valve housing.

2 Claims, 7 Drawing Figures

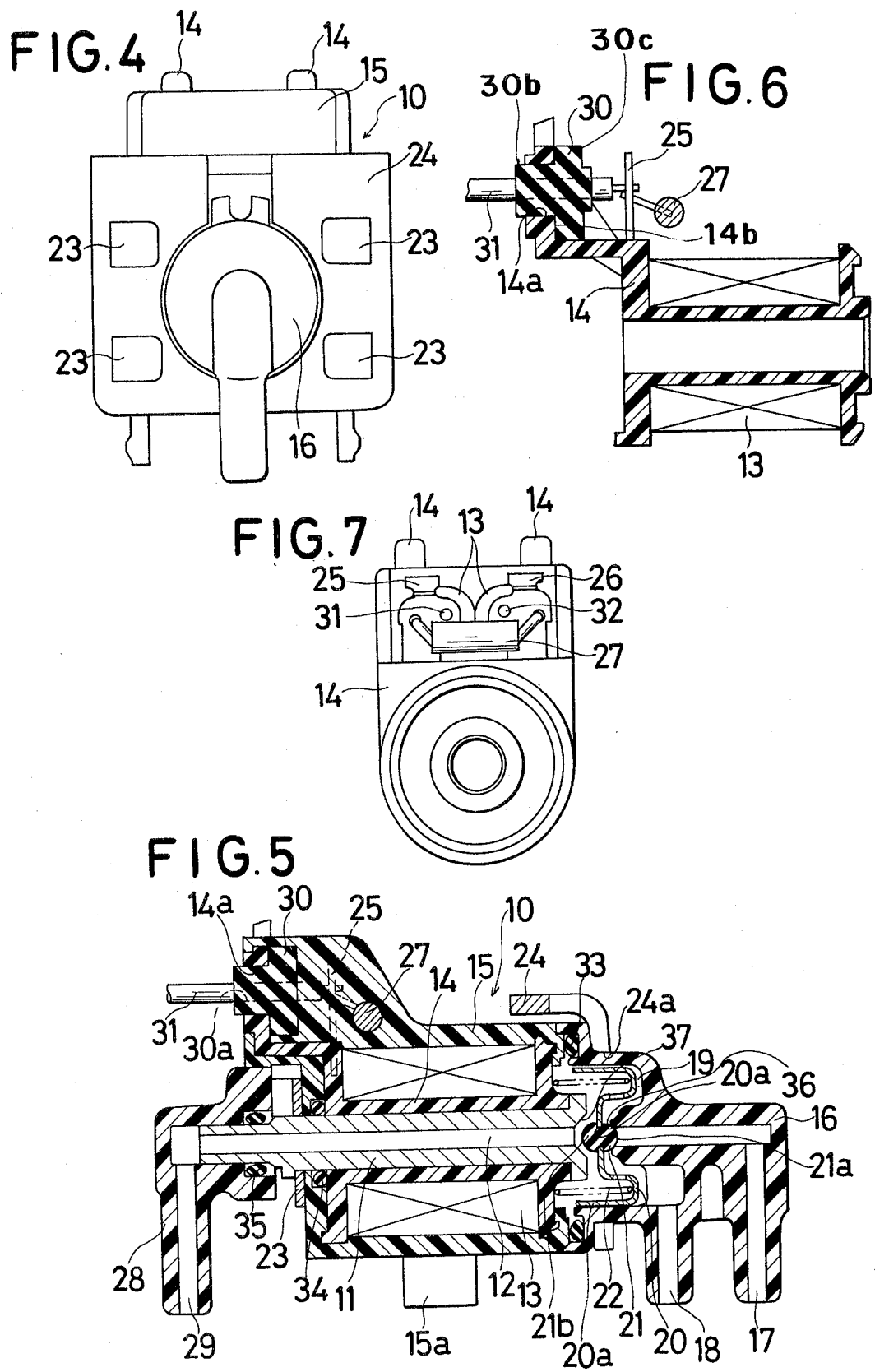

SOLENOID VALVE

BACKGROUND OF THE INVENTION

1. Field of the Invention

The present invention relates to a solenoid valve and more particularly to an improvement in a solenoid valve providing a waterproof member located at the portion where lead wires are passed through a valve housing. One end of the lead wires is connected electrically to a magnet coil installed in the valve housing while the other ends of the lead wires are connected electrically to a control circuit arranged outwardly from the valve housing.

2. Description of the Prior Art

A conventional solenoid valve is disclosed, for example, in U.S. Pat. No. 3,726,315 granted on Apr. 10, 1973 to Sheppard. Such conventional solenoid valve is not provided with a waterproofing member at the portion where the lead wire is passed through a valve housing but is merely provided with an insulating block which constitutes one part of the housing and may not realize waterproofing.

It is necessary to replace the insulating block with a waterproof member which is hereinafter described to overcome the defects in such a conventional solenoid valve. The waterproof member made of epoxide resin is located at the portion where lead wires are connected electrically to a magnet coil installed in a valve housing and is formed at a narrow opening of the valve housing to pass the lead wires by casting during final processing of solenoid valve structure. With the mechanical construction of the solenoid valve, it is observed that the waterproof member causes microscopic interstices from the valve housing by the material difference in both members and may not realize waterproofing such that soldering for the lead wires electrically connected to the magnet coil and passing through the narrow opening is not easy. Consequently, assembling thereof is difficult according to the conventional type.

SUMMARY OF THE INVENTION

One of the objects of the present invention is to provide a solenid valve which will overcome the defects in the conventional solenoid valve.

Another object of the present invention is to provide a solenoid valve which will delete the casting process of the waterproof member.

A further object of the present invention is to provide a solenoid valve which is low in cost and simple to manufacture According to the invention, the waterproof member is made of rubber or similar material and inserted with lead wires which are embedded to the valve housing by molding.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several view, and wherein:

FIG. 4 is a right side view of the solenoid-operated fluid control valve shown in FIG. 1;

FIG. 5 is a sectional view taken along the line V—V of FIG. 1;

FIG. 6 is a vertical sectional view through the magnet coil assembly used in the embodiment of FIG. 1; and FIG. 7 is a left side view of the magnet coil assembly used in the embodiment of FIG. 1.

DETAILED EXPLANATION OF THE PREFERRED EMBODIMENT

Figure 1:
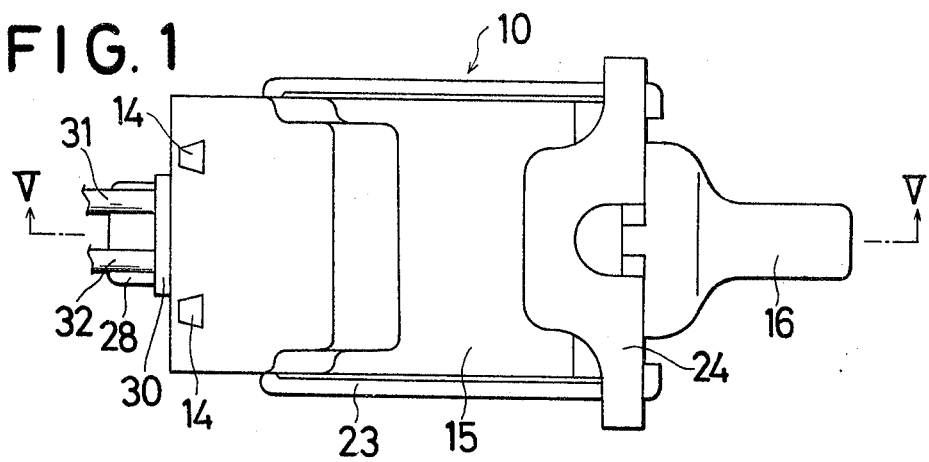
FIG. 1 is a plane view of a solenoid-operated fluid control valve embodying the invention.

A solenoid-operated control valve embodying the present invention is designated generally by reference numeral 10. The valve 10 includes a magnetic valve core 11 having a port 12; an annular magnet coil 13 surrounding a bobbin 14 having an opening 14a and wall portion 14b to which the valve core 11 is secured; and non-magnetic and non-conductive protective cover or housing 15 acting as the valve housing which is made of synthetic resin and which surrounds the annular magnet coil and has flanges 15a and 15b to allow for easy installation of the valve 10 to a body of an automotive vehicle; a non-magnetic cover 16 which has ports 17 and 18 and forms with the bobbin 14 a valve chamber 19 which communicates with ports 12, 17 and 18; a valve member 20 inserted in the valve chamber 19 and made of a magnetic metal plate by pressing; a seal element 21 retained by a center opening 20a of valve member 20; a compression spring 22 contained within valve chamber 19 which urges valve member 20 toward an opening or port 17; magnetic yokes 23 which are connected with the magnetic core 12 and extended along the outer surface of protective cover 15; a magnetic bracket 24 having vertical and horizontal arms, the vertical arm having an opening 24a surrounding the valve chamber 19 and the horizontal arm providing a magnetic path between the magnet coil 13 and the valve member 20; terminal 25, 26 which are electrically connected with both ends of magnet coil 13 by soldering and partially embedded in cover 15; a resistor 27 which is electrically connected between the terminals 25 and 26; a non-magnetic pipe 28 having a port 29 communicated with port 12; one end of lead wires 31 and 32 being electrically connected with both terminals 25 and 26 by soldering and the other end thereof being electrically connected with a control circuit (not shown); waterproof member 30 includes a large diameter portion 30c and a small diameter portion 30b made of rubber or similar material and inserted with lead wires 31 and 32 in openings 30a and 30b thereof which are installed at opening 14a of bobbin 14 and embedded to the cover 15 by molding of cover 15 such that small diameter portion 30b is positioned within opening 14a and large diameter portion 30c contacts wall 14b in a watertight manner; and sealing rings 33, 34 and 35.

The embedding process of waterproof member 30 is hereinafter described:

(1) lead wires 31 and 32 are passed through the openings 30a and 30b of waterproof member 30;

(2) one of the ends of lead wires 31 and 32 are connected to terminals 25 and 26 by soldering so that terminals 25 and 26 are embedded in the bobbin 14 and are connected electrically to the magnetic coil 13 and the resistor 27;

(3) the small diameter portion 30b of waterproof member 30 is installed at the opening 14a of bobbin 14 and large diameter portion 30c watertight contacts wall 14b; and (4) the waterproof member 30, the bobbin 14, the terminals 25 and 26, one of the ends of lead wires 31 and 32, and magnet coil 13 are embedded in the cover 15 by molding of cover 15.

The magnetic yokes 23 are engaged with magnetic valve core 11 at their one ends whereas the other ends of magnetic yokes 23 pass through openings of the vertical arm of bracket 24 and then bend as shown in FIG. 4 whereby valve core 11, covers 15 and 16, and bracket 24 are rigidly combined in unison by the magnetic yokes 23. Valve member 20 has a cylindrical side wall 20a which faces to the opening 24a of vertical arm of bracket 24.

A tapered valve seat 36 is formed at the opening of port 17 to abut on spherical surface 21a of the seal element 21. A tapered valve seat 37 which communicates with port 12 is formed at the end of valve core 11 to abut spherical surface 21b of seal element 21.

At the state of de-energization of coil 13, valve member 20 is urged toward valve seat 36 by the action of compression spring 22 whereby spherical surface 21b of seal element 21 is kept away from valve seat 37. Thus port 12 communicates with port 18 through valve chamber 19. The port 17 is interrupted from communication with valve chamber 19 because spherical surface 21a of seal element 21 abuts valve seat 36.

When coil 13 is energized a magnetic flux is generated in valve core 11, which passes yokes 23, bracket 24 and valve member 20 and a magnetic attractive force is generated between the end surface of valve core 11 and valve member 20. Therefore valve member 20 moves toward valve seat 37 against the action of spring 22 to abut on spherical surface 21b of seal element 21 on valve seat 37. Thus port 12 is interrupted from communication with chamber 19 and port 18 communicates with port 17 through valve chamber 19.

Figure 2:
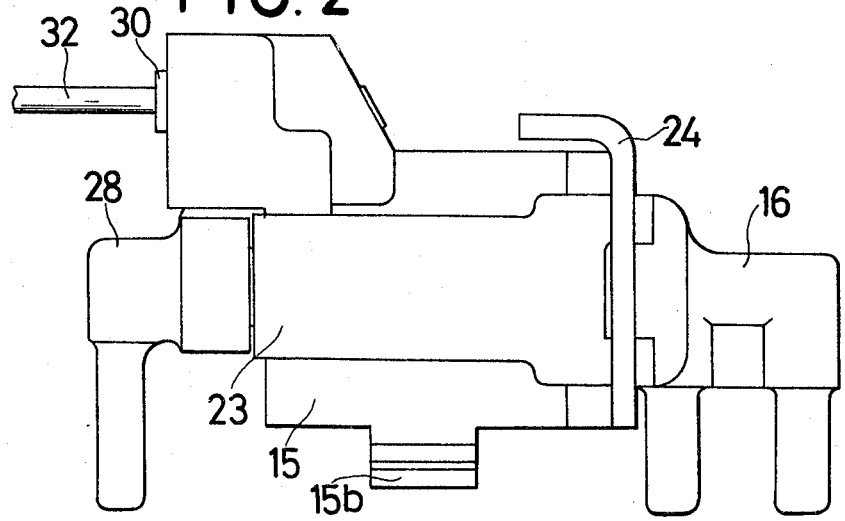
FIG. 2 is a front view of the solenoid-operated fluid control valve shown in FIG. 1.
Figure 3:
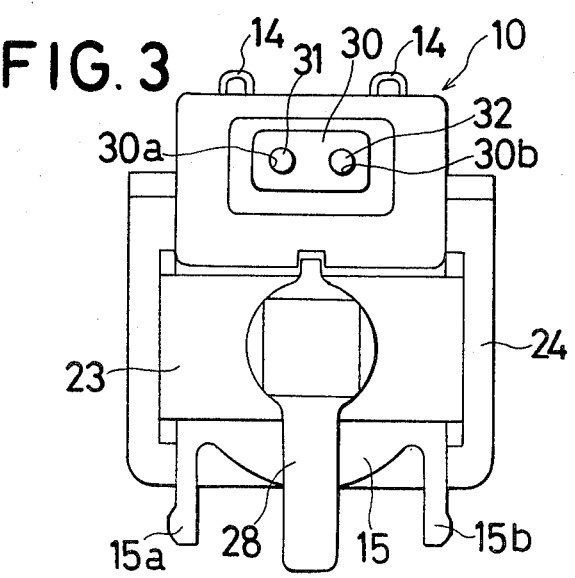
FIG. 3 is a left side view of the solenoid-operated fluid control valve shown in FIG. 1.

The solenoid-operated fluid control valve 10 shown in FIGS. 1 through 5 and described hereinbefore may be employed for controlling idling throttle opening of an engine with a vacuum actuator, in which case port 12 communicates with the atmosphere, port 17 communicates with a vacuum pressure source and port 18 communicates with a vacuum chamber of the acturator which increases throttle opening of the engine in response to the degree of the vacuum in its vacuum chamber. When the load of the engine increases, e.g, a power steering device is actuated, engine problems such as engine stopping are prevented by energizing the coil 13 of valve 10 because valve 10 connects the vacuum chamber of the actuator with the vacuum pressure source through port 17, chamber 19 and port 18 of valve 10 whereby the actuator increases the throttle opening to accelerate idling rotational speed of the engine.

According to the present invention, the waterproof member 30 is made of rubber and inserted with lead wires 31 and 32 which is embedded to the cover 15 acting as the valve housing. Therefore, valve 10 is low in cost and simple to manufacture. Furthermore, the waterproof member 30 will realize sufficient waterproofing due to the elasticity thereof. In addition, soldering for the lead wires electrically connected to the magnetic coil is possible along a wide space before the molding of valve housing and it is easy to pass the same through the narrow opening of valve housing.

Obviously many modifications and variations of the present invention as possible in light of the above teachings. It is therefore to be understood that within the scope of the appended claims the invention may be practiced otherwise than as specifically described herein.

What is claimed as new and intended to be secured by Letters Patent of the United States is:

1. A solenoid valve sealing assembly comprising:
   a valve housing which comprises synthetic resin and defines a valve chamber;
   a magnetic coil wound on a bobbin for generating a magnetic flux;
   magnetic valve means supported in said chamber for valve movement by said magnetic flux;
   a plurality of terminals which are electrically connected at both ends of said magnetic coil;
   lead wires which are electrically connected with said terminals for supplying an electrical signal to said magnetic coil; and
   a rubber waterproof member having a large diameter portions and a small diameter portion and a plurality of openings formed therein for providing waterproofing between said valve housing and said lead wires wherein said lead wires are positioned in said plurality of openings formed in said waterproof member, respectively and said waterproof member is positioned in said valve housing by molding of said valve housing, said bobbin having a wall portion and an opening formed therein and said small diameter portion of said waterproof member is positioned in said opening of said bobbin and said large diameter portion of said waterproofing member watertightly contacting said wall portion of said bobbin.

2. A sealing assembly as claimed in claim 1, wherein said bobbin, said terminals and said magnetic coil are positioned in said valve housing.

* * * * *

UNITED STATES PATENT AND TRADEMARK OFFICE
CERTIFICATE OF CORRECTION

PATENT NO. : 4,299,374
DATED : Nov. 10, 1981
INVENTOR(S) : Minoru Yamanaka

It is certified that error appears in the above—identified patent and that said Letters Patent is hereby corrected as shown below:

On the title page, Assignee should read

--(73) Assignee: Aisin Seiki Kabushiki Kaisha, Kariya, Japan --.

Signed and Sealed this

Ninth Day of March 1982

[SEAL]

Attest:

GERALD J. MOSSINGHOFF

*Attesting Officer*    *Commissioner of Patents and Trademarks*